United States Patent
Kennedy et al.

(10) Patent No.: US 11,016,303 B1
(45) Date of Patent: May 25, 2021

(54) CAMERA MUTE INDICATION FOR HEADSET USER

(71) Applicant: Facebook Technologies, LLC, Menlo Park, CA (US)

(72) Inventors: Brian Kennedy, Seattle, WA (US); Sam Sarmast, Redmond, WA (US); Fletcher Nelson, Kent, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/739,063

(22) Filed: Jan. 9, 2020

(51) Int. Cl.
*G09G 5/00* (2006.01)
*G02B 27/01* (2006.01)
*G06F 3/01* (2006.01)

(52) U.S. Cl.
CPC ......... *G02B 27/0172* (2013.01); *G06F 3/013* (2013.01); *G02B 2027/0112* (2013.01); *G02B 2027/0178* (2013.01); *G02B 2027/0187* (2013.01)

(58) Field of Classification Search
CPC ................................ G06F 3/013; G06F 3/017
See application file for complete search history.

(56) References Cited

U.S. PATENT DOCUMENTS

| | | | |
|---|---|---|---|
| 8,830,142 B1* | 9/2014 | Kim ........................ | G06F 3/017 345/8 |
| 2013/0227641 A1* | 8/2013 | White ..................... | G06F 21/57 726/1 |
| 2015/0058649 A1* | 2/2015 | Song ..................... | G06F 1/3209 713/323 |
| 2015/0169047 A1* | 6/2015 | Reponen ................ | H04N 7/181 345/156 |
| 2016/0054710 A1* | 2/2016 | Jo ........................... | G04G 9/00 715/763 |
| 2019/0204911 A1* | 7/2019 | Chu ......................... | G06T 7/70 |

* cited by examiner

*Primary Examiner* — Nan-Ying Yang
(74) *Attorney, Agent, or Firm* — Fenwick & West LLP

(57) ABSTRACT

To address privacy issues with "always on" cameras of an AR headset, the cameras can be muted and content displayed by the headset adjusted to provide a user with a visual indication that the cameras are deactivated. The headset includes a display element configured to display content to a user and an eye tracking system that includes a camera configured to track eye motion of the user. In response to the headset receiving a camera muting event from the user or the external environment, the headset deactivates the camera and adjusts the content displayed on the display element to provide the user with a visual indication that the camera is deactivated. In one embodiment, the visual indication is an adjustment of the display from a default RGB color mode to "monochrome" or other predefined color map.

18 Claims, 7 Drawing Sheets

CAMERA MUTE INDICATION FOR HEADSET USER

FIELD OF ART

The present disclosure generally relates to headsets, and specifically relates to providing a visual indicator to a user when one or more cameras of an artificial reality headset are muted.

BACKGROUND

Artificial reality (AR) headsets (e.g., virtual reality and augmented reality) often include several cameras that continuously capture images of an environment around the headset for use in displaying content to users. Example headset camera use-cases include depth estimation, user eye tracking, image classification, and so forth. The "always on" nature of these cameras presents privacy issues when, for example, AR headsets are used in public contexts. To address these issues, AR headsets may allow users to mute the cameras to deactivate continuous image capture.

SUMMARY

To address privacy issues with "always on" cameras of an AR headset, the cameras can be muted and content displayed by the headset adjusted to provide a user with a visual indication that the cameras are deactivated. The headset includes a display element configured to display content to a user and an eye tracking system that includes a camera configured to track eye motion of the user. In response to the headset receiving a camera muting event (e.g., from the user or the external environment), the headset deactivates the camera and adjusts the content displayed on the display element to provide the user with a visual indication that the camera is deactivated. In one embodiment, the visual indication is an adjustment of the display from a default RGB color mode to "monochrome" or other predefined color map.

Figure 1:
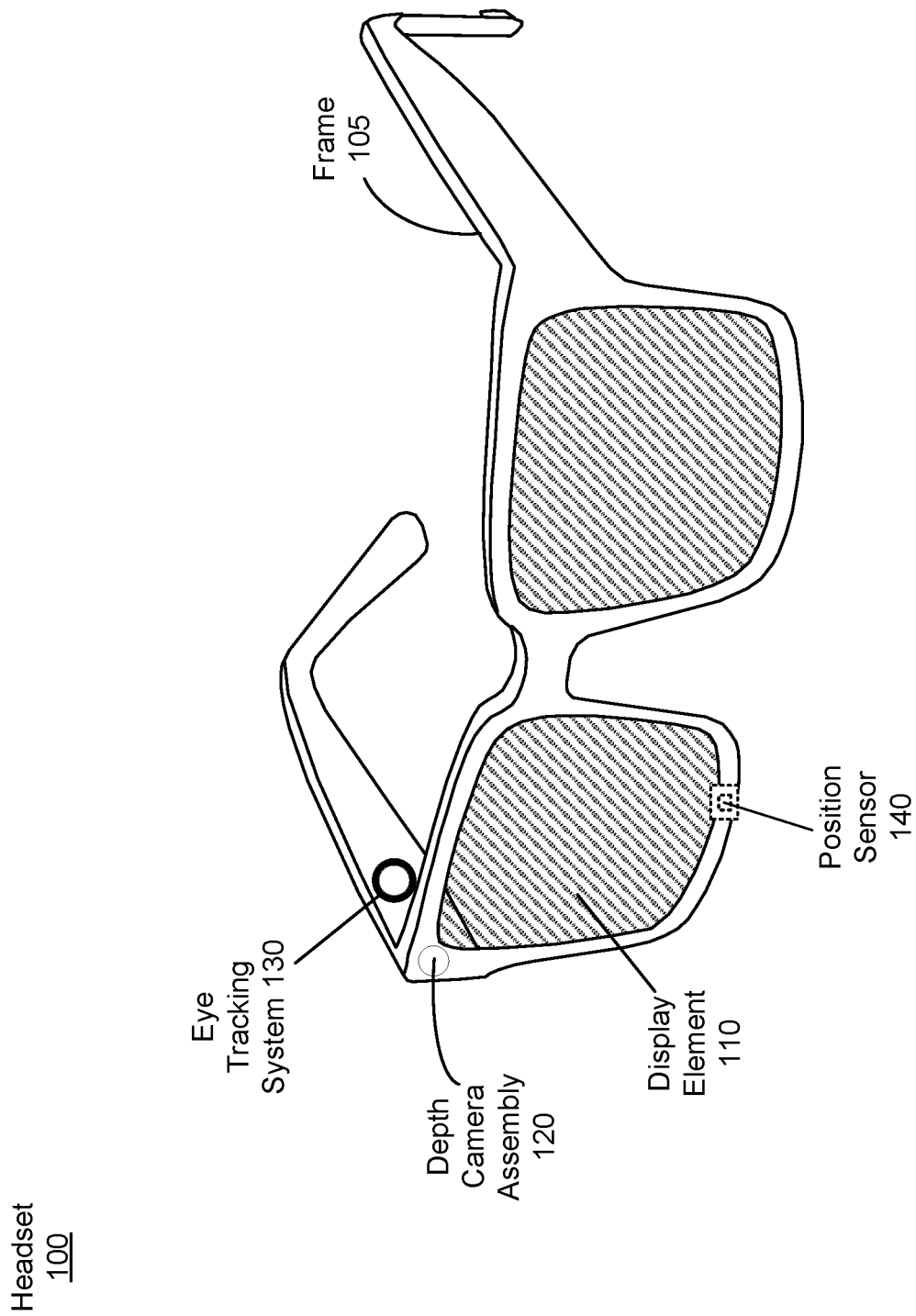
FIG. 1 is a perspective view of a headset implemented as an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

Embodiments relate to a headset which includes one or more display elements and one or more cameras. The headset may be an augmented reality (AR) headset, a virtual reality (VR) headset, a mixed reality (MR) headset, or any additional headset operable to display virtual content to a wearing user. The display elements display virtual content to the user of the headset by directing image light at an eyebox of the user. For the purposes of displaying the virtual content, the cameras of the headset periodically or continuously capture images of the environment around the headset.

Mute functionality of the cameras is provided as a privacy feature for "always on" headsets, but some of these cameras are used for other system use-cases and functionality. Additionally, the state of mute functionality may be relayed to not just the outside world to provide an indication to people that the user's cameras are muted (e.g., when a user walks into a locker room or public restroom), but also to the user of the headset (e.g., if they forget the cameras are muted). For example, in one embodiment, eye tracking cameras are being used to apply color corrections to address issues with display uniformity. Even though these cameras are focused at a short distance (e.g., the lenses/displays of the headset) and have shallow depth of field, security and privacy requirements are driving towards disabling these cameras in certain instances. In this example, the headset would lose access to gaze information from these cameras and, thus, the device would be unable to use gaze information for color corrections during this time. Thus, in one embodiment, the display is adjusted to a "monochrome" mode while the eye tracking cameras are disabled. The display adjustment may also be a predefined color map that may mask the lack of color correction being applied while the cameras are disable. This solution also has the added benefit of providing visual feedback to the user that the device is also actively in mute mode.

The cameras may be positioned on the headset in several locations, depending on their functionality. For example, the cameras may be positioned on the front of the headset and directed outwards toward the area in front of the user. In this case, the cameras may be used for object recognition and depth estimation. As another example, the cameras may be positioned on the inside of the headset (e.g., mounted on the arms of a headset) and directed towards the display elements or eyes of the user. In this case, the cameras may be used for tracking the gaze direction of the user's eyes.

Exemplary Headset

FIG. 1 is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. Examples of media content presented by the headset 100 include one or more images, video, audio, or some combination thereof. The headset 100 includes a frame 105, and may include, among other components, one or more display elements 110, a depth camera assembly (DCA) 220, an eye tracking system 130, and a position sensor 140. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 105 holds the other components of the headset 100. The frame 105 includes a front part that holds the one or more display elements 110 and end pieces to attach to a head (e.g., temples) of the user. The front part of the frame 105 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 110 are configured to display virtual content by generating image light to a user wearing the headset 100. As illustrated the headset includes a display element 110 for each eye of a user. In some embodiments, a display element 110 generates image light that is provided to an eyebox of the headset 100. The eyebox is a location in space that an eye of the user occupies while wearing the headset 100. For example, a display element 110 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 110 are opaque and do not transmit light from a local area around the headset 100. In this case, the local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 110 are at least partially transparent, such that light from the local area may be combined with light from the one or more display elements to produce AR and/or MR content.

In some embodiments, a display element 110 does not generate image light, and instead is a lens that transmits light from the local area to the eyebox. For example, one or both of the display elements 110 may be a lens without correction (non-prescription) or a prescription lens (e.g., single vision, bifocal and trifocal, or progressive) to help correct for defects in a user's eyesight. In some embodiments, the display element 110 is polarized and/or tinted to protect the user's eyes from the sun.

Note that in some embodiments, the display element 110 includes an additional optics block (not shown). The optics block may include one or more optical elements (e.g., lens, Fresnel lens, etc.) that direct light from the display element 110 to the eyebox. The optics block may, e.g., correct for aberrations in some or all of the image content, magnify some or all of the image, or some combination thereof.

The DCA 120 determines depth information for a portion of a local area surrounding the headset 100. The DCA 120 includes one or more imaging devices (e.g. cameras) and a DCA controller (not shown in FIG. 1).

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis, some other technique to determine depth of a scene, or some combination thereof.

The eye tracking system 130 is configured to determine eye tracking information of an eye of the user. The eye tracking system 130 includes one or more cameras and one or more projectors used for determining eye tracking information. Eye tracking information includes, e.g., movement information, position and orientation, gaze direction (e.g., where a user is looking), vergence, etc. In some embodiments, the eye tracking system 130 provides the generated eye tracking information to one or more of the display elements 110. In one embodiment, the display elements 110 utilizes the eye tracking information (e.g., gaze direction) to dynamically adjust brightness and/or colors displayed on portions of the display element 110 to mitigate color abnormalities.

The position sensor 140 generates one or more measurement signals in response to motion of the headset 100. The position sensor 140 may be located on a portion of the frame 105 of the headset 100. The position sensor 140 may include an inertial measurement unit (IMU). Examples of position sensor 140 include: one or more accelerometers, one or more gyroscopes, one or more magnetometers, another suitable type of sensor that detects motion, a type of sensor used for error correction of the IMU, or some combination thereof. The position sensor 140 may be located external to the IMU, internal to the IMU, or some combination thereof.

In some embodiments, the headset 100 provides for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices of the DCA also function as the PCA. The images captured by the PCA and the depth information determined by the DCA may be used to determine parameters of the local area, generate a model of the local area, update a model of the local area, or some combination thereof. Furthermore, the position sensor 140 tracks the position (e.g., location and pose) of the headset 100 within the room.

In some embodiments, the headset 100 includes privacy settings specifying how data collected by various headset components can be accessed, stored, or otherwise used. In particular, privacy settings may specify how data collected by the DCA 120 (e.g. images of the environment about the headset 100), the eye tracking system 130 (e.g. images of the user's eyes), the PCA (e.g. color image data), or any additional component of the headset 100 is used. For example, a privacy setting may prevent the headset 100 from permanently storing eye tracking data or transmitting the data to a third-party system. The privacy settings may be specified by the headset 100, and/or may be configurable by a user of the headset 100. Privacy settings are discussed in greater detail below with reference to FIG. 6.

Figure 2:
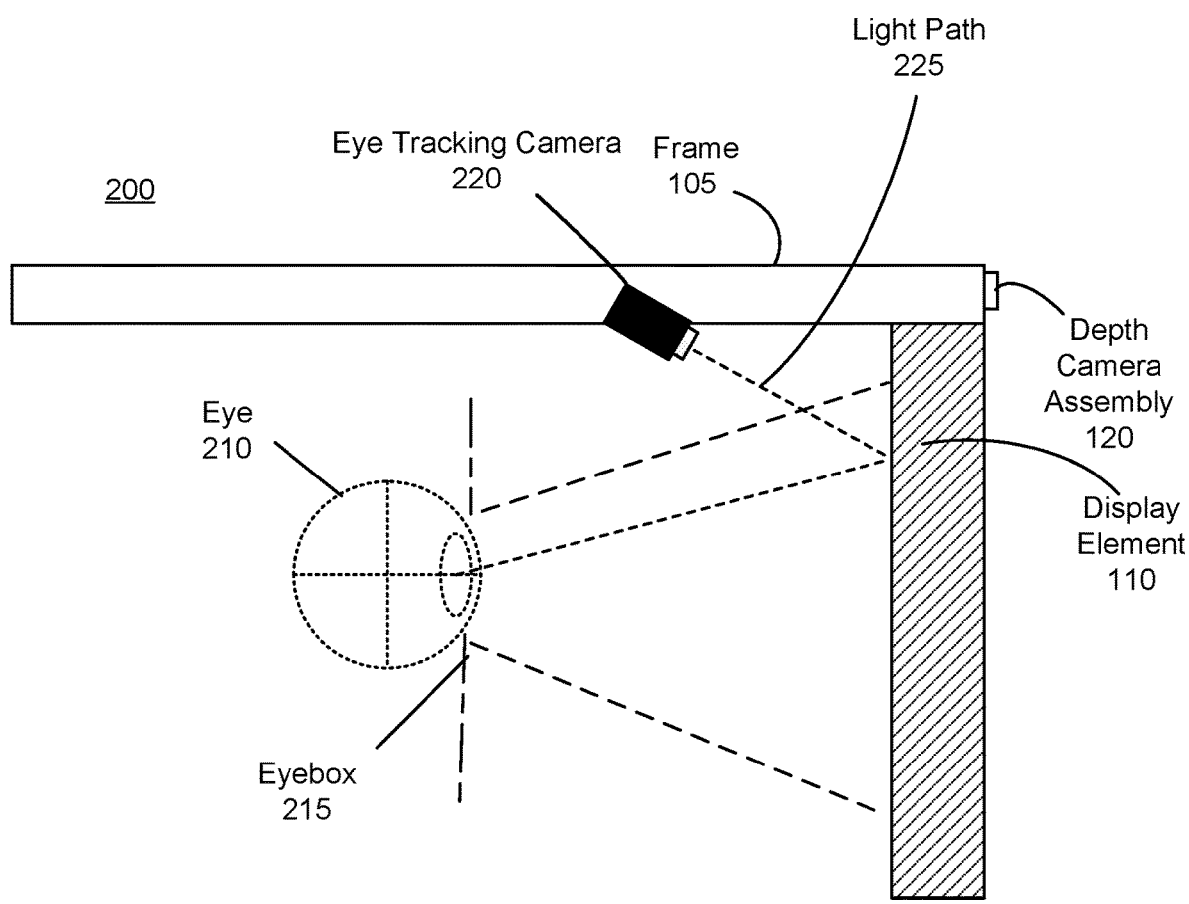
FIG. 2 is a cross-section of the headset illustrated in FIG. 1, in accordance with one or more embodiments.

FIG. 2 is a cross-section 200 of the headset 100 illustrated in FIG. 2, in accordance with one or more embodiments. The display element 110 presents content (i.e., image light) to an eye 210 in an eyebox 215. The eyebox 215 is a location where the eye 210 is positioned while the user wears the headset 100. For purposes of illustration, FIG. 2 shows the cross section 200 associated with a single eye 210 and the display element 110, while another display element, separate from the display element 110 shown in FIG. 2, provides image light to an eyebox of the other eye of the user.

The eye tracking camera 220 is one component of the eye tracking system 130. In particular, one or more projectors of the eye tracking camera 220 illuminates the eye 210 with infrared (IR) light. In one embodiment, the one or more projectors emit the IR light from the eye tracking camera 220 toward the display element 110 via light path 225. As shown in FIG. 2, light path 225 shows IR light emitted from eye tracking camera 220 being reflected off the display element 110 to the eye 210 of the user. The eye 210 reflects the IR light back toward the display element 110 and the eye tracking camera 220, pointed at the display element 110, subsequently captures images of the IR light from the eye 210. The headset 100 processes the images captured by the eye tracking camera to determine the eye tracking information of the user. Additionally, in other embodiments, the eye tracking system 130 is positioned on the headset 100 in locations different from those shown in FIG. 2, such as the eye tracking camera 220 being pointed at the eye 210 instead of at the display element 110.

Camera Mute System

Figure 3:
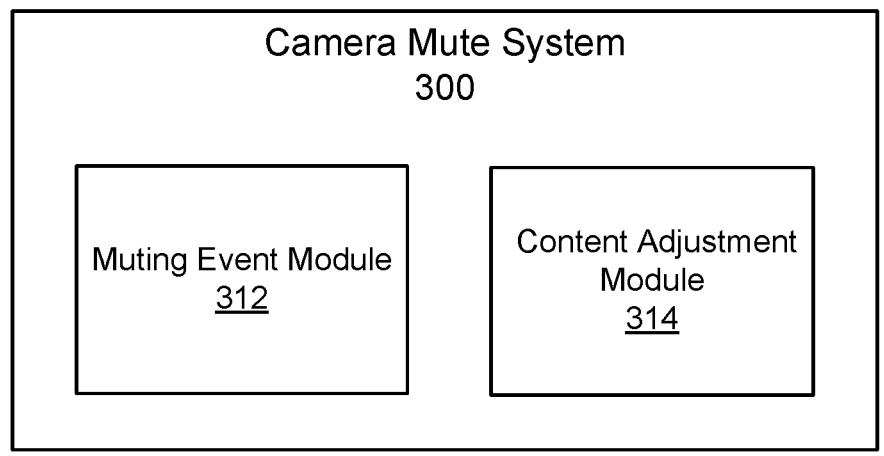
FIG. 3 is a block diagram of a camera mute system for receiving and processing camera muting events, in accordance with one or more embodiments.

FIG. 3 is a block diagram of a camera mute system 300 for receiving and processing camera muting events, in accordance with one or more embodiments. In particular, the camera mute system 300 is a component of the headset 100 and is configured to provide a user of headset 100 with a visual indication that the cameras of headset 100 (e.g. the eye tracking camera 220, DCA, object recognition cameras, etc.) are muted. In various embodiments, the camera mute system 300 is a component of an AR headset, a VR headset, an MR headset, or any other wearable device with a camera and a display element. The camera mute system 300 includes a muting event module 312 and a content adjustment module 314. In other embodiments, the camera mute system 300 can have any combination of elements listed with any additional systems, modules, or elements.

The muting event module 312 receives camera muting events to mute or unmute one or more cameras of headset 100, depending on the current state of the cameras. The term camera muting event, as used herein, refers to an indication to the camera mute system 300 to toggle (i.e., activate or deactivate) image capture of one or more cameras of the headset 100. A camera muting event may be manually initiated by input from a user of the headset 100, such as by pressing a physical or virtual button on the headset 100. A camera muting event may also be automatically generated in response to one or more criteria being met (e.g., geofencing, object recognition, etc.). For example, muting event module 312 may regularly receive geographic location information from a GPS receiver of headset 100 and a camera muting event may be automatically generated when the headset 100 enters a particular geographic location. The muting event module 312 also communicates with the cameras of the headset 100 (e.g., eye tracking camera 220, the DCA 110, the object recognition cameras, etc.) and the content adjustment module 314. For example, in response to muting the cameras, the muting event module 312 sends the content adjustment module 314 an instruction to provide the user with a visual indication that the cameras are muted.

The content adjustment module 314 adjusts the display of content displayed on the display element 110 based on the current state of the cameras of headset 100. For example, if the eye tracking camera 220 is muted the content adjustment module 314 may adjust some or all of the colors used to display the virtual content (e.g., displayed using a single color, gray scale, or other subset of colors). In response to receiving an instruction from the muting event module 312, the content adjustment module 314 returns the display of the adjusted content to one or more default colors (e.g., RGB). In other embodiments, adjusting the display of content includes displaying an icon, text (e.g., "Camera Mute" at the top of the display element 110, etc.), or other additional element on the display that provides the user with a visual indication that the cameras are in a mute state.

Method for Processing Camera Muting Events

Figure 4:
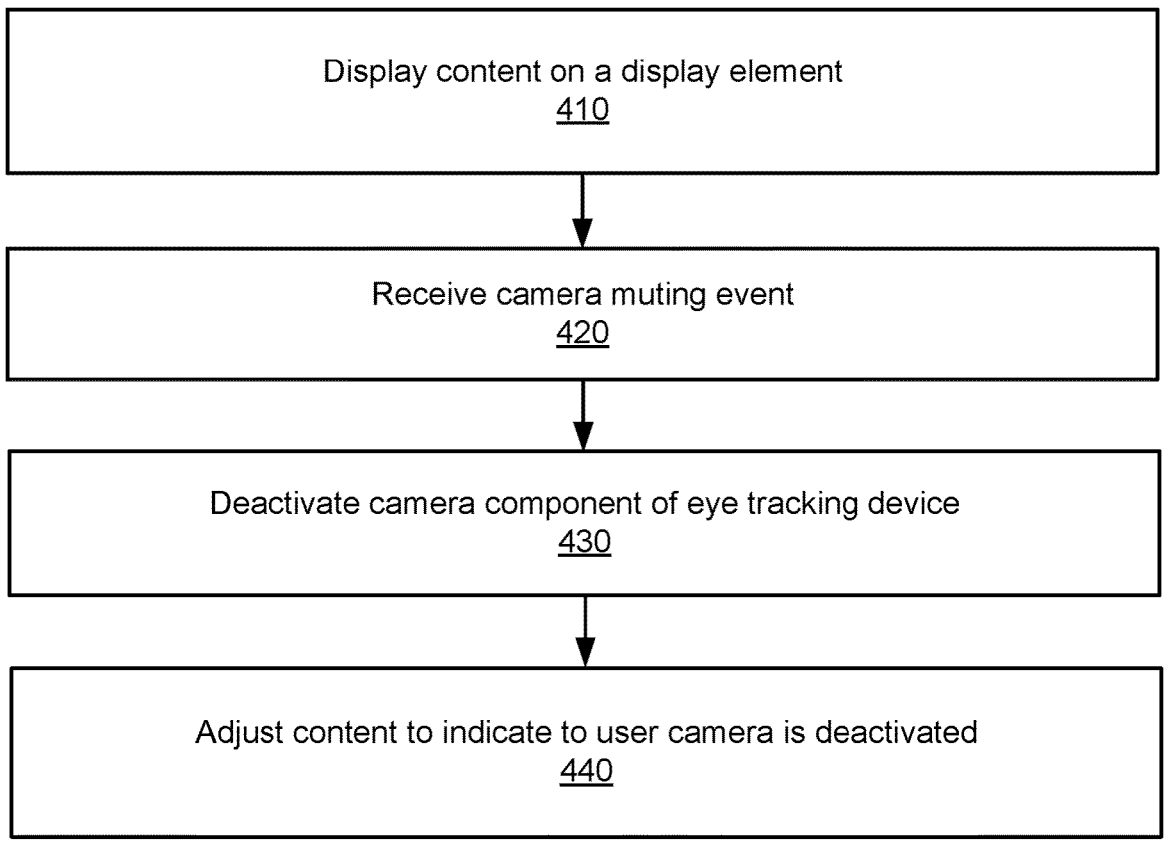
FIG. 4 is a flowchart illustrating a process for handling a camera muting event, in accordance with one or more embodiments.

FIG. 4 is a flowchart illustrating a process 400 for processing camera muting events, in accordance with one or more embodiments. The process 400 of FIG. 4 may be performed by the components of a device, e.g., the camera muting system 300 of headset 100. Other entities (e.g. components shown in FIG. 6) may perform some or all the steps of the process in other embodiments. Likewise, embodiments may include different and/or additional steps, or perform the steps in different orders.

The headset 100 displays 410 content on a display element 110. This is a default state of the headset 100 during normal operation. The content may be AR, VR, MR, or any other form of virtual content. In some embodiments, the content is AR and a user wearing the headset 100 can see both the content displayed on the display element 110 and objects in their local area. The displayed content may additionally be two dimensional (e.g. a user interface icon) or three dimensional (e.g. a character model). The content may be displayed using a plurality of colors, and the colors may change dynamically. The exact content may be determined by a software component of headset 100, such as an AR or VR application.

The headset 100 receives 420 a camera muting event. In some embodiments, the camera muting event is received in response to a user interaction with the headset 100. For example, the user may press a camera mute button on the frame 105. In another example, the headset 100 may include an audio receiver and software instructions capable of interpreting voice commands from the user. In this case, the camera muting event may be received in response to a user voice command requesting that the cameras of headset 100 be muted or unmuted. In the same or different embodiments, the headset 100 automatically generates a camera muting event in response to a criterion being met. For example, the headset 100 may prompt the user to manually mute the cameras via the display element 110 or another component of headset 100.

The headset 100 may automatically generate a camera muting event after the headset enters or exits a particular geographic region as indicated by a GPS receiver or other location determination components. For example, the headset 100 may have access to a set of mute geographic regions or positions which are designated as regions where the camera component should be muted. In this case, the headset 100 may periodically or continuously compare the location of the headset 100 to the set of mute geographic regions, and generate a camera muting event upon determining that the headset 100 has entered or exited one of the mute geographic regions. The set of mute geographic regions may be stored locally on the headset 100 or stored on a remote server and accessed via a network connection (e.g. a local area network (LAN) or wireless connection).

The headset may also have access to location data describing where camera muting events have previously occurred for one or more devices (e.g. headset 100). In this case, the headset 100 may automatically generate a camera muting event after the number of camera muting events in a particular region exceeds a certain threshold. The headset

100 may process the location data to determine whether the threshold is met, or the location data may be processed on a remote server and regions with camera muting events exceeding the threshold may be added to the set of mute geographic regions as described above. In another embodiment, the headset 100 compares a current location of the headset 100 to the locations where muting events previously occurred included in the location data. In this case, the headset 100 may determine that a similarity between the current location and the previous locations meets a similarity threshold and responsively generate a camera muting event. In one embodiment, the headset 100 uses a machine learned model predict whether a given current location should result in a camera muting event. In this case, the machine learned model may be trained using the accessed location data, and may additionally be trained using contextual location information. For example, the user may regularly mute the cameras of headset 100 when they enter a particular building on a college campus (e.g., locker room) and, in response to receiving more than a threshold number of muting events at this location, the headset 100 may automatically mute the cameras when the user is about to enter the building after this point. Contextual location information may be determined using image classification software, as described below.

The headset 100 may also include object recognition and image classification software which recognizes and/or classifies the contents of images received from the cameras in the local area of the user. The images may be classified based on environment context and the headset 100 may automatically generate a camera muting event after certain predefined environment contexts are identified. For example, when the user enters a location where image capture would be inappropriate (e.g. a locker room, restroom, etc.), the cameras may be automatically muted in response to recognizing a restroom symbol or other symbol indicative of privacy.

Responsive to receiving the camera muting event, the headset 100 mutes 430 the cameras. Accordingly, the headset 100 provides one or both of the cameras with an instruction to discontinue image capture. Headset 100 includes one or more eye tracking cameras and one or more outward facing cameras for object recognition and depth estimation. In one embodiment, the eye tracking cameras are used to apply color corrections to address issues with display uniformity. Even though these cameras are focused at a short distance and have shallow depth of field, security and privacy requirements are driving towards disabling these cameras in certain instances. Thus, muting these cameras would prevent the headset from access to gaze information from these cameras and, thus, the device would be unable to apply color corrections during this time.

Accordingly, in response to the muting event, the headset 100 adjusts 440 the content displayed by the display element 110 to indicate to the user of headset 100 that the cameras are muted. In one embodiment, the headset 100 changes the colors used to display the virtual content on the display element 110 to a single color. For example, the colors used to display the virtual content on display element 110 may all be changed to gray. In another embodiment, the colors used to display the virtual content are adjusted to a set of colors defined by a predetermined color map. As used herein, a "color map" refers to a set of rules for transforming a set of given input colors to a set of output colors (e.g. mapping any instance of orange, red, or green to blue). For example, two-dimensional content may be displayed using one color, while three-dimensional content may be displayed using a second color. This solution not only provides the user with a visual indication that the cameras are in a mute state, but also masks the inability of headset 100 to apply display color correction during this time while headset 100 does not have access to the user's gaze information.

In other embodiments, the headset 100 adjusts the content displayed by display element 110 by adding an additional icon, symbol, or object which indicates that the camera is muted. For example, the display element 110 may display a camera icon with a general prohibition symbol (i.e. circle-backslash symbol) on display element 110.

Although the process 400 is discussed in reference to a camera muting event resulting in the camera component being muted, one skilled in the art will recognize that parallel processes apply in the case wherein the camera is unmuted. For example, when the cameras are in a mute state and the headset 100 receives an unmuting event to unmute the cameras and return the display of virtual content to that of a normal or default mode (e.g., from its adjusted state).

Figure 5A:
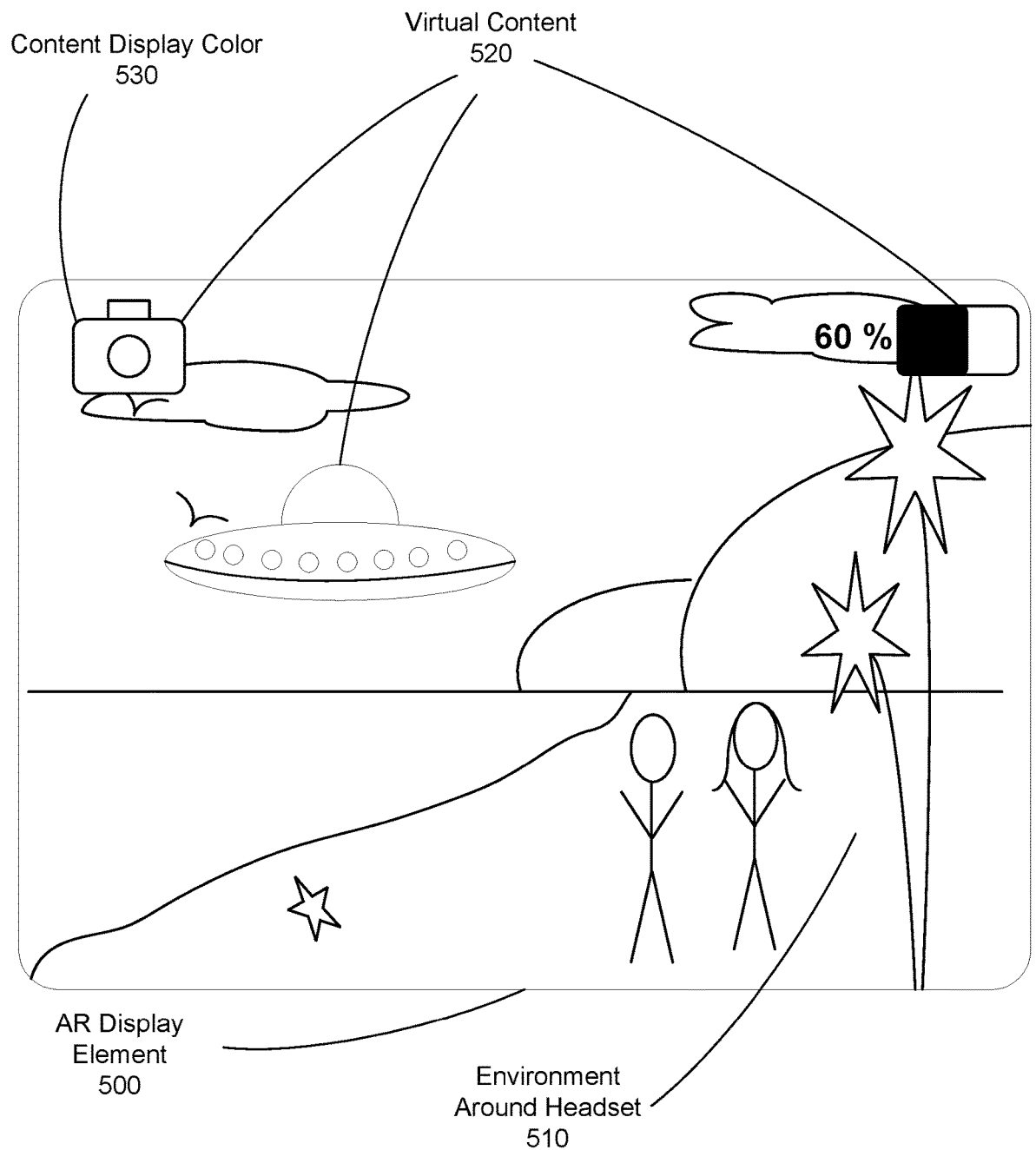
FIG. 5A shows example augmented reality content displayed by a headset with unmuted cameras in an environment in which the headset may be used, in accordance with one or more embodiments.

FIG. 5A shows example AR content displayed by a headset with unmuted cameras in an environment in which the headset may be used, in accordance with one or more embodiments. In particular, FIG. 5A depicts a beach scene viewed using an AR headset, wherein the display of the scene includes real mountains, people, trees, birds, clouds, and a starfish, and a virtual camera icon, battery level icon, and spaceship. The AR content includes both virtual content 520 and objects in the environment about the headset 510, wherein the virtual content is displayed using a transparent AR display element 500 (e.g. display element 110) and the objects in the environment about the headset 510 are visible through the AR display element 500. In alternative embodiments, the headset is a VR headset which displays VR content. In this case, all of the content is virtual content displayed using a non-transparent display element, although the virtual content may comprise video of the surrounding environment about the headset 510 captured by camera components of the AR headset.

The virtual content 520 includes several virtual objects. In particular, the virtual content 520 included in FIG. 5A includes both two-dimensional (i.e. the camera and battery level icons) and three-dimensional (i.e. the space ship) objects. Three-dimensional objects may be displayed by the AR display element 500 such that the objects appear to be in the three-dimensional space of the environment about the headset 510, such as the spaceship depicted in FIG. 5A. The display of any three-dimensional objects may dynamically update as a user wearing the AR headset moves about the environment or the components of the AR headset simulate movement of the three-dimensional objects. For example, the location of simulated light reflecting off of the spaceship depicted in FIG. 5A may change as the user walks towards or away from the spaceship. The display of three-dimensional virtual content may be facilitated by a camera component which collects depth information about object in the environment around the AR headset 510 (e.g. DCA 120).

The virtual content 520 is displayed by the AR display element using one or more content display colors 530. The content display color 530 of a given virtual object may be specified by software components of the AR headset, and may change dynamically over time based on the user's interaction with the virtual content 520. For example, the user may select a virtual object by directing their tracked gaze at the object which results in the object's color changing to indicate the selection. In reference to FIG. 5A, the user may be able to select or otherwise interact with any of the displayed two-dimensional or three-dimensional objects, which may result in the content display color 530 changing. The tracking of user gaze may be facilitated by a camera component of an eye tracking system (e.g. eye tracking system 130).

Figure 5B:
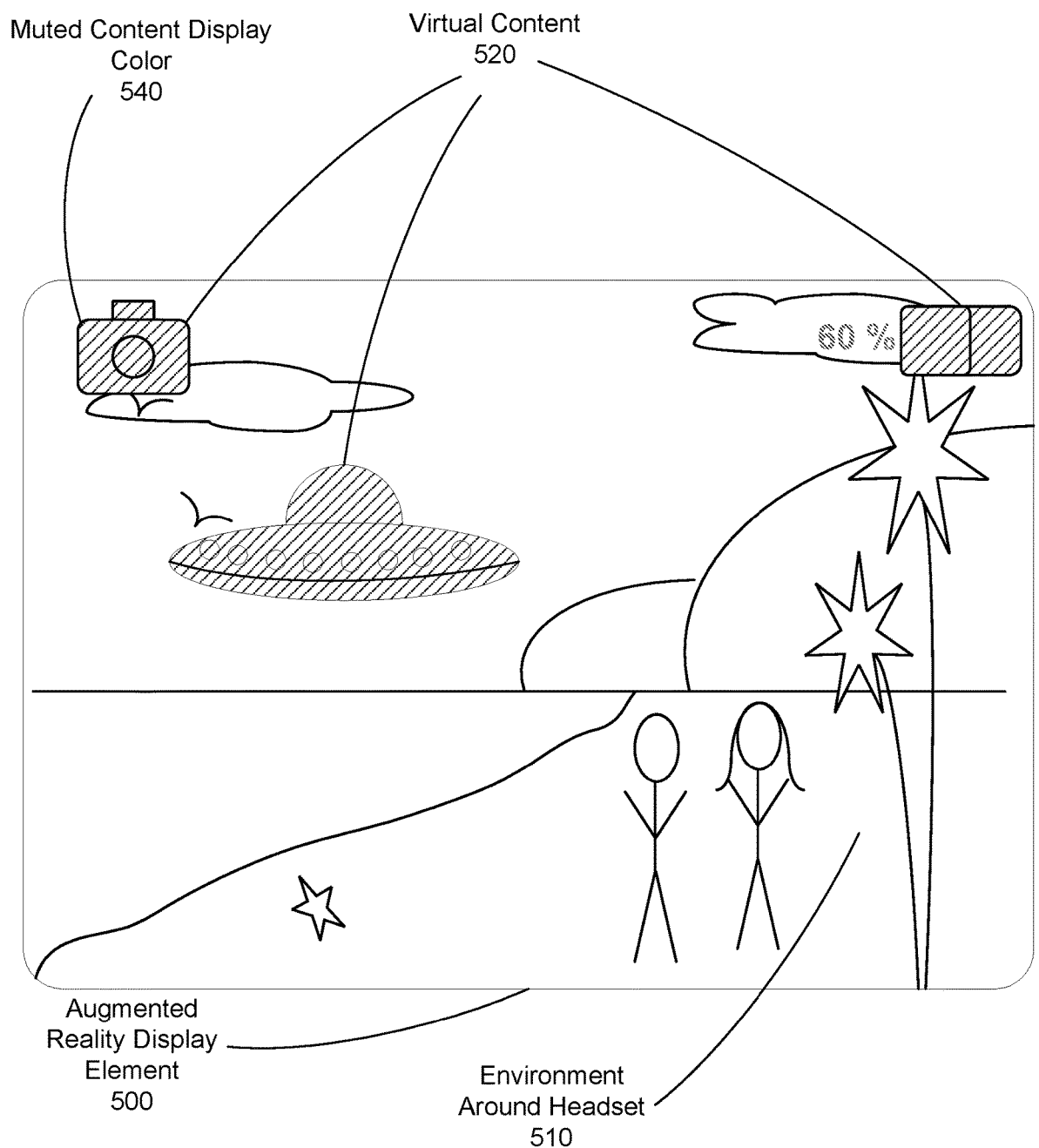
FIG. 5B shows the augmented reality content shown in FIG. 5B following a camera muting event, in accordance with one or more embodiments.

FIG. 5B shows the same augmented reality content shown in FIG. 5B following a camera muting event, in accordance with one or more embodiments. In response to muting one or more camera components of the AR headset, the content display colors 530 have been adjusted to a single muted content display color 540 (indicated by the diagonal strip pattern) which is used to display one or more virtual objects from the virtual content 520. While the camera components of the AR headset are still muted, the display of the virtual content with muted content display color 540 may not change based on any user interactions with the virtual content. For example, the display of the virtual content may not change when the user directs their gaze at a virtual object or moves about the environment around the headset 510. In other embodiments, the muted content display color 540 may still change in response to selection or motion interactions (e.g. selecting a UI button, rotating the headset), but remain unchanged in response to any camera or audio related interactions (e.g. gaze direction or voice commands). In still other embodiments, the headset is a VR headset which displays virtual content. In this case, all of the objects displayed by the VR headset would be displayed using the muted content display color 540. If the AR headset received an additional camera muting event while displaying virtual content 520 as depicted by FIG. 5A, the AR headset may again adjust the virtual content 520 to be displayed as depicted in FIG. 5B.

The muted content display color 540 used to display virtual content 520 provides an indication to the user that the camera component is muted. In some embodiments, the muted content display color 540 has high contrast such that the virtual content 520 can be easily differentiated from objects in the environment by the user. The muted content display color 540 is a single color, however multiple colors (e.g. defined in a color map) may be used which vary depending on the virtual object being displayed, as described above in relation to FIG. 1.

System Environment

Figure 6:
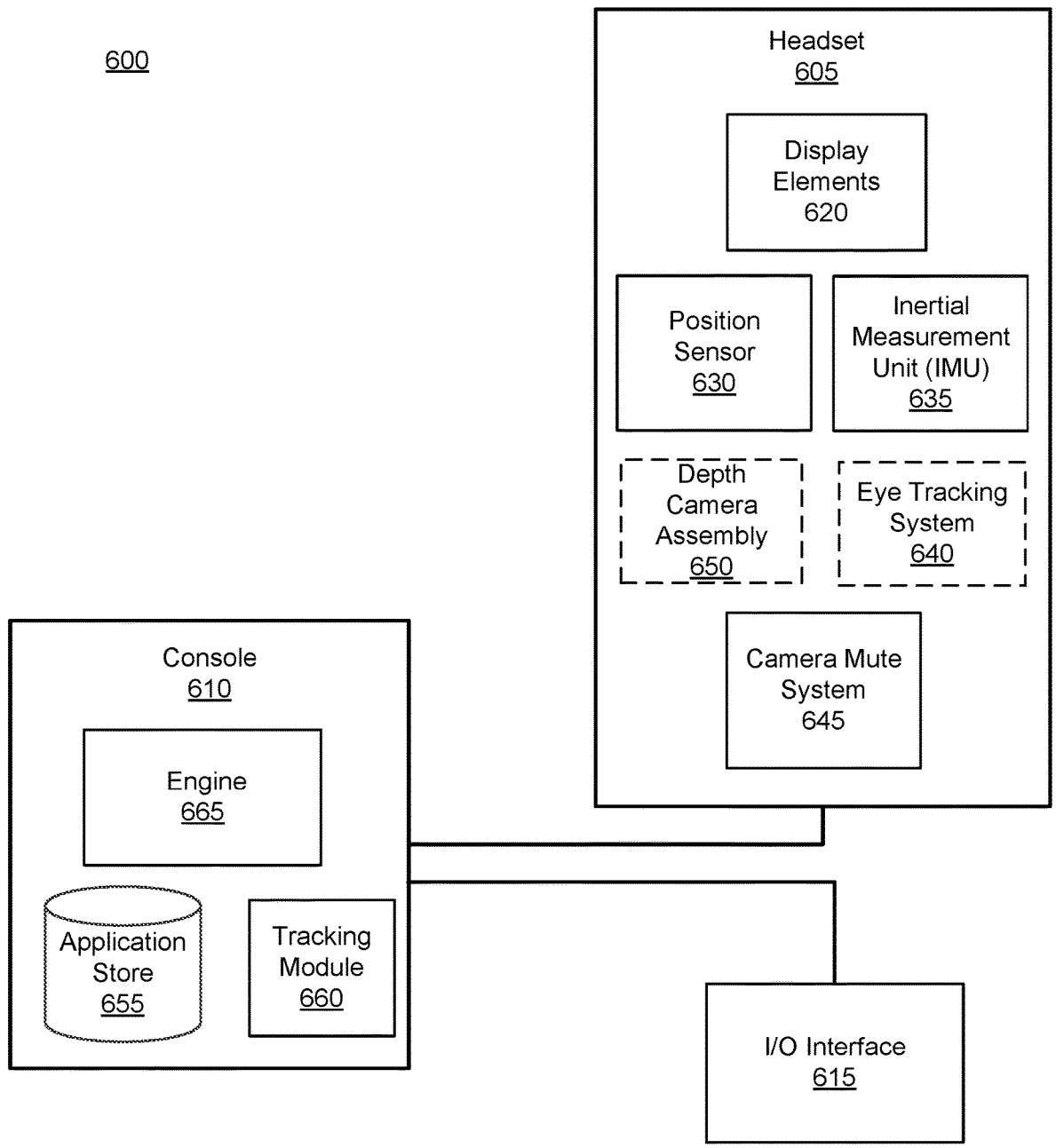
FIG. 6 a block diagram of a system environment that includes a headset and a console, in accordance with one or more embodiments.

FIG. 6 is a block diagram of an artificial reality system 600, according to one or more embodiments. The system 600 may operate in e.g., a VR system environment, an AR system environment, a MR system environment, or some combination thereof. The system 600 shown by FIG. 6 comprises a headset 605, a console 610, and an input/output (I/O) interface 615. While FIG. 6 shows an example system 600 including one headset 605 and on I/O interface 615, in other embodiments any number of these components may be included in the system 600. For example, there may be multiple headsets 605 each having an associated I/O interface 615, with each headset 605 and I/O interface 615 communicating with the console 610. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the headset 605.

The headset 605 may be a HMD or a NED that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 605, the console 610, or both, and presents audio data based on the audio information. An embodiment of the headset 605 is the headset 100 described above in conjunction with FIGS. 2 and 3.

The headset 605 includes display elements 620 a camera mute system 645, and an eye tracking system 640. The headset may also include one or more position sensors 630, an inertial measurement unit (IMU) 635, and an optional depth camera assembly (DCA) 650. Some embodiments of the headset 605 have different components than those described in conjunction with FIG. 6. Additionally, the functionality provided by various components described in conjunction with FIG. 6 may be differently distributed among the components of the headset 605 in other embodiments.

The display elements 620 present content to the user. The display elements 620 include, for each eye, a respective display element. A display element emits image light toward a corresponding eyebox. The display element may be, e.g., a liquid crystal display (LCD), an organic light emitting diode (OLED) display, an active-matrix organic light-emitting diode display (AMOLED), transparent OLED display, some other display, or some combination thereof. In some embodiments, the display elements 620 also includes a waveguide, a scanning assembly (e.g., a scanning mirror), or some combination thereof. In some embodiments, the display elements 620 are be micro-displays. A micro display is a display element that have a small emission area that has a diagonal that is at most 2 inches. In some embodiments the display elements 620 are integrated components of a headset. For example, the display elements 620 may be lenses on AR or mixed reality MR glasses or screens on a virtual reality VR headset. In the same or different embodiments (e.g., AR and/or MR), some or all of the display elements 620 are at least partially transparent to visible light. In these embodiments, light from the local area about the display elements 620 may pass through the display elements 130 to an eye of the user.

The IMU 635 is an electronic device that generates data indicating a position of the headset 605 based on measurement signals received from one or more of the position sensors 630 and from the depth information received from the DCA 650. A position sensor 630 generates one or more measurement signals in response to motion of the headset 605. Examples of position sensor 630 include: one or more accelerometers, one or more gyroscopes, one or more magnetometers, another suitable type of sensor that detects motion, a type of sensor used for error correction of the IMU 635, or some combination thereof. The position sensors 630 may be located external to the IMU 635, internal to the IMU 635, or some combination thereof.

Based on the one or more measurement signals from one or more position sensors 630, the IMU 635 generates data indicating an estimated current position of the headset 605 relative to an initial position of the headset 605. For example, the position sensors 630 include multiple accelerometers to measure translational motion (forward/back, up/down, left/right) and multiple gyroscopes to measure rotational motion (e.g., pitch, yaw, roll). In some embodiments, the IMU 865 rapidly samples the measurement signals and calculates the estimated current position of the headset 605 from the sampled data. For example, the IMU 635 integrates the measurement signals received from the accelerometers over time to estimate a velocity vector and integrates the velocity vector over time to determine an estimated current position of a reference point on the headset 605. Alternatively, the IMU 635 provides the sampled measurement signals to the console 610, which interprets the data to reduce error. The reference point is a point that may be used to describe the position of the headset 605. The reference point may generally be defined as a point in space or a position related to the orientation and position of the headset 605.

In some embodiments, the headset 605 further includes the DCA 650. The DCA may be an embodiment of the DCA 120. The DCA 650 captures data describing depth information of the local area surrounding the headset 605. In embodiments not shown the DCA 650 is external to the headset 605 and captures images of the headset 605 within the local area. The DCA 650 uses one or more depth determination techniques to determine depth information. The depth determination techniques may include, e.g., structured light, stereo vision, time of flight, some other depth determination technique, or some combination thereof. The DCA 650 can compute the depth information using the data, or the DCA 650 can send this information to another device such as the console 610 that can determine the depth information using data from the DCA 650.

The eye tracking system 640 tracks the user's eye. For example, the eye tracking system 640 projects structured light to the eye and collect structured light reflected back from the eye to determine a position and/or orientation of the eye. The eye tracking system 640 can detect gaze directions of the eye. The detected gaze directions can be used, e.g., by display elements 620, to dynamically adjust brightness of portions of one or more display assemblies to mitigate visibility of seams. The eye tracking system 640 is an embodiment of the eye tracking system 130.

The camera mute system 645 receives (or identifies) and processes camera muting events. The camera mute system 645 may be an embodiment of the camera mute system 110. Camera muting events may be received in response to a user interaction or input with any of the components of system 600 including the headset 605, the console 610, and the I/O interface 615. Additionally, camera muting events may be identified when the camera mute system 645 or other component of system 600 determines that a criterion for a camera muting event is met. Furthermore, one or more components of system 600 may send a camera muting event to the camera mute system 645. The camera mute system 645 toggles the mute state (i.e. mutes or unmutes) one or more camera components of the headset 605 upon receiving or identifying a camera muting event. Example camera components include cameras integrated with the eye tracking system 640 or the DCA 650. After successfully toggling the mute state of the one or more cameras, the camera mute system 645 adjusts the display of content on the display elements 620 to indicate the current mute state of the one or more cameras to a user of headset 605.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 635 that captures calibration data indicating an estimated position of the I/O interface 615 relative to an initial position of the I/O interface 615. In some embodiments, the I/O interface 615 provides haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the headset 605 for processing in accordance with information received from one or more of: the DCA 650, the headset 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the headset 605 or the I/O interface 615. Examples of applications include: gaming applications, conferencing applications, video playback applications, or other suitable applications.

The tracking module 660 calibrates the system 600 using one or more calibration parameters and may adjust one or more calibration parameters to reduce error in determination of the position of the headset 605 or of the I/O interface 615. For example, the tracking module 660 communicates a calibration parameter to the DCA 650 to adjust the focus of the DCA 650 to more accurately determine positions of structured light elements captured by the DCA 650. Calibration performed by the tracking module 660 also accounts for information received from the IMU 635 in the headset 605 and/or an IMU 635 included in the I/O interface 615. Additionally, if tracking of the headset 605 is lost (e.g., the DCA 650 loses line of sight of at least a threshold number of structured light elements), the tracking module 660 may re-calibrate some or all of the system 600.

The tracking module 660 tracks movements of the headset 605 or of the I/O interface 615 using information from the DCA 650, the one or more position sensor 630, the IMU 635 or some combination thereof. For example, the tracking module 660 determines a position of a reference point of the headset 605 in a mapping of a local area based on information from the headset 605. The tracking module 660 may also determine positions of the reference point of the headset 605 or a reference point of the I/O interface 615 using data indicating a position of the headset 605 from the IMU 635 or using data indicating a position of the I/O interface 615 from an IMU 635 included in the I/O interface 615, respectively. Additionally, in some embodiments, the tracking module 660 uses portions of data indicating a position or the headset 605 from the IMU 635 as well as representations of the local area from the DCA 650 to predict a future location of the headset 605. The tracking module 660 provides the estimated or predicted future position of the headset 605 and/or the I/O interface 615 to the engine 665.

In some embodiments, the engine 665 generates a three-dimensional mapping of the area surrounding the headset 605 (i.e., the "local area") based on information received from the headset 605. In some embodiments, the engine 665 determines depth information for the three-dimensional mapping of the local area based on information received from the DCA 650 that is relevant for techniques used in computing depth. The engine 665 may calculate depth information using one or more techniques in computing depth from the portion of the reflected light detected by the DCA 650, such as stereo based techniques, the structured light illumination technique, and the time-of-flight technique. In various embodiments, the engine 665 uses the depth information to, e.g., update a model of the local area, and generate content based in part on the updated model.

The engine 665 also executes applications within the system 600 and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the headset 605 or haptic feedback via the I/O interface 615.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element specifies a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

Embodiments according to the invention are in particular disclosed in the attached claims directed to a method, an apparatus, and a storage medium, wherein any feature mentioned in one claim category, e.g. method, can be claimed in another claim category, e.g. apparatus, storage medium, system, and computer program product, as well. The dependencies or references back in the attached claims are chosen for formal reasons only. However, any subject matter resulting from a deliberate reference back to any previous claims (in particular, multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
A display element configured to display content to a user;
an eye tracking system including a camera configured to track eye motion of the user;
a controller configured to:
display content including one or more virtual objects on the display element;
apply color uniformity corrections to a plurality of colors used to display the one or more virtual objects based on tracked eye motion of the user; and
responsive to a camera muting event:
deactivate the camera; and
adjust the displayed content to indicate the camera is deactivated by displaying the one or more virtual objects using a predefined color map that masks a lack of color uniformity corrections applied to the one or more virtual objects due to deactivating the camera.

2. The system of claim 1, wherein the predefined color map adjusts one or more colors of the plurality of colors used to display the one or more virtual objects to one or more predefined colors that are not affected by the lack of color uniformity corrections.

3. The system of claim 1, wherein the system is configured to be worn by the user.

4. The system of claim 1, wherein the display element is transparent and the content is augmented reality content.

5. The system of claim 1, wherein the camera is directed at the display element and the eye motion is determined based on light reflected off the eye and captured by the camera.

6. The system of claim 1, wherein the controller is further configured to:
responsive to a second camera muting event, activate the camera.

7. The system of claim 1, wherein the camera muting event is initiated by an interaction of the user with the headset, the interaction selected from the group consisting of a voice command, a hand motion, the tracked eye motion, and any combination thereof.

8. A method comprising:
displaying content including one or more virtual objects on a display element of a device, the device including a camera configured to track eye motion of the user;
apply color uniformity corrections to a plurality of colors used to display the one or more virtual objects based on tracked eye motion of the user;
receiving, at the device, a camera muting event; and
responsive to receiving the camera muting event:
deactivating the camera; and
adjusting the displayed content to indicate the camera is deactivated by displaying the one or more virtual objects using a predefined color map that masks a lack of color uniformity corrections applied to the one or more virtual objects due to deactivating the camera.

9. The method of claim 8, wherein the predefined color map adjusts one or more colors of a plurality of colors used to display the one or more virtual objects to one or more predefined colors that are not affected by the lack of color uniformity corrections.

10. The method of claim 8, wherein adjusting the displayed content includes displaying a mute icon.

11. The method of claim 8, wherein the display is transparent and the content is augmented reality content.

12. The method of claim 8, wherein receiving the camera muting event comprises:
responsive to an interaction by the user with the device, initiating, by the device, the camera muting event.

13. The method of claim 12, wherein the interaction is selected from the group consisting of a voice command, a hand motion, the tracked eye motion, and any combination thereof.

14. The method of claim 8, wherein receiving the camera muting event comprises:
receiving geographic positioning information for the device;
comparing the geographic positioning information to a set of predefined camera mute geographic regions; and
determining, based on the comparison, that the geographic positioning information is in a camera mute geographic region of the set of predefined camera mute geographic regions.

15. The method of claim 8, wherein receiving the camera muting event comprises:
receiving, from a second camera of the device, images of an environment around the device;
classifying one or more images of the environment as having a context category from a set of context categories;
comparing the context category to a set of predefined camera mute context categories; and
determining, based on the comparison, that the context category is one of the camera mute context categories.

16. The method of claim 8, wherein receiving the camera muting event comprises:
receiving geographic positioning information for the device;
comparing the geographic positioning information to a set of geographic positions at which a camera muting event previously occurred; and
determining, based on the comparison, that a similarity between the received geographic positioning information and the geographic positioning information of one or more geographic positions from the set of geographic positions is above a threshold.

17. The method of claim 16, further comprising:
prompting, responsive to determining the similarity is above a threshold, the user to initiate the camera muting event; and
receiving an interaction with the headset by the user initiating the camera muting event.

18. The system of claim 1, wherein the camera muting event comprises:
receiving geographic positioning information for the device;
comparing the geographic positioning information to a set of predefined camera mute geographic regions; and
determining, based on the comparison, that the geographic positioning information is in a camera mute geographic region of the set of predefined camera mute geographic regions.

* * * * *